United States Patent [19]
Pelka

[11] Patent Number: 5,721,795
[45] Date of Patent: Feb. 24, 1998

[54] HIGH EFFICIENCY EJECTION OF LIGHT FROM OPTICAL WAVE GUIDE, BY HOLOGRAPHICALLY PRODUCED LIGHT SCATTERING MEANS

[75] Inventor: David G. Pelka, Los Angeles, Calif.

[73] Assignee: TIR Technologies, Inc., Carson City, Va.

[21] Appl. No.: 649,284

[22] Filed: May 17, 1996

[51] Int. Cl.⁶ ........................................ G02B 6/34
[52] U.S. Cl. ................ 385/37; 385/12; 385/38; 385/129; 385/901
[58] Field of Search ................ 385/37, 12, 38, 385/129, 130, 132, 147, 901; 435/6; 356/243

[56] References Cited

U.S. PATENT DOCUMENTS

| | | |
|---|---|---|
| 1,421,506 | 7/1922 | Limpert . |
| 3,915,148 | 10/1975 | Fletcher et al. ............ 126/271 |
| 3,941,993 | 3/1976 | Hubert ........................ 240/1.4 |
| 3,970,070 | 7/1976 | Meyer et al. ............... 126/271 |
| 4,002,031 | 1/1977 | Bell ........................... 126/271 |
| 4,022,186 | 5/1977 | Northrup, Jr. ............... 126/271 |
| 4,074,704 | 2/1978 | Gellert ........................ 126/270 |
| 4,103,673 | 8/1978 | Woodworth et al. ........ 126/271 |
| 4,108,540 | 8/1978 | Anderson et al. ........... 350/211 |
| 4,116,223 | 9/1978 | Vasilantone ................. 126/271 |
| 4,124,017 | 11/1978 | Paull .......................... 126/270 |
| 4,136,670 | 1/1979 | Davis .......................... 126/271 |
| 4,171,695 | 10/1979 | Sletten ........................ 126/438 |
| 4,194,949 | 3/1980 | Stark .......................... 202/180 |
| 4,337,759 | 7/1982 | Popovich et al. ........... 126/438 |
| 4,749,248 | 6/1988 | Aberson, Jr. et al. ....... 385/37 |
| 4,755,921 | 7/1988 | Nelson ........................ 362/307 |
| 5,150,966 | 9/1992 | Nelson ........................ 362/337 |
| 5,340,715 | 8/1994 | Slovacek et al. ........... 385/12 X |
| 5,404,869 | 4/1995 | Parkyn, Jr. et al. ........ 126/699 |
| 5,525,466 | 6/1996 | Slovacek et al. ........... 385/12 X |

FOREIGN PATENT DOCUMENTS

| | | |
|---|---|---|
| 1325086 | 8/1973 | United Kingdom . |
| 1325087 | 8/1973 | United Kingdom . |
| 1546791 | 5/1979 | United Kingdom . |
| 1546792 | 5/1979 | United Kingdom . |
| 1546793 | 5/1979 | United Kingdom . |
| 1557472 | 12/1979 | United Kingdom . |
| 1561129 | 2/1980 | United Kingdom . |
| 2239939 | 1/1993 | United Kingdom . |
| 2239940 | 12/1993 | United Kingdom . |

*Primary Examiner*—Phan T. H. Palmer
*Attorney, Agent, or Firm*—William W. Haefliger

[57] ABSTRACT

Radiant electromagnetic energy transmitting apparatus, comprising an elongated body consisting of electromagnetic energy transmitting material, the energy injected into the body to travel therein and to be trapped during the travel by total internal reflecting off walls defined by the body, and there being at least one site within the body having variegated surface relief acting to scatter incident radiant energy for ejection from the body as rays defining a selected solid angle.

24 Claims, 4 Drawing Sheets

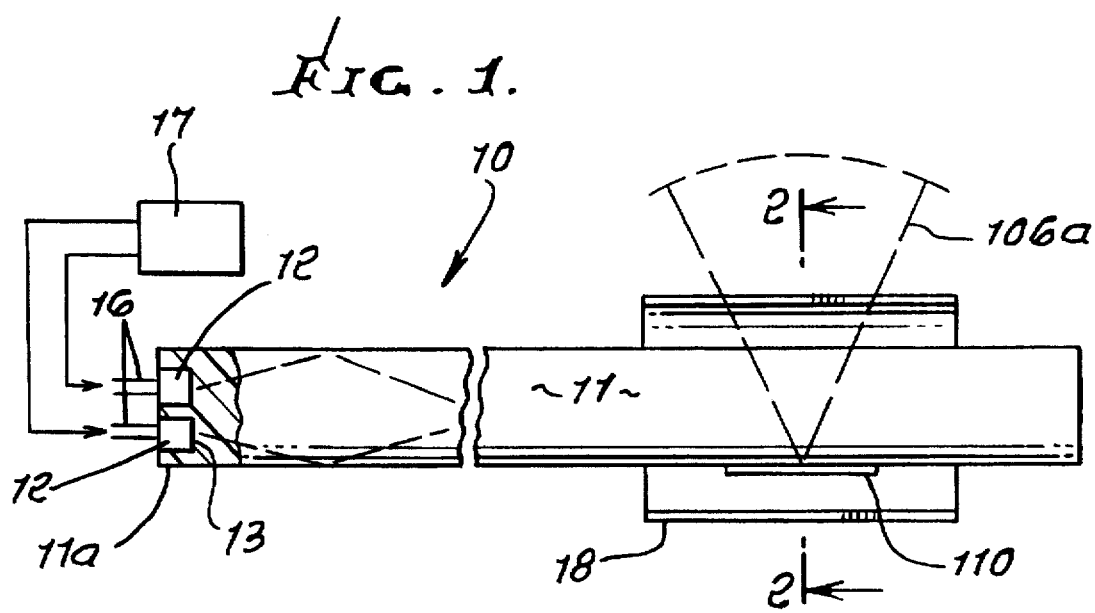
FIG. 1.
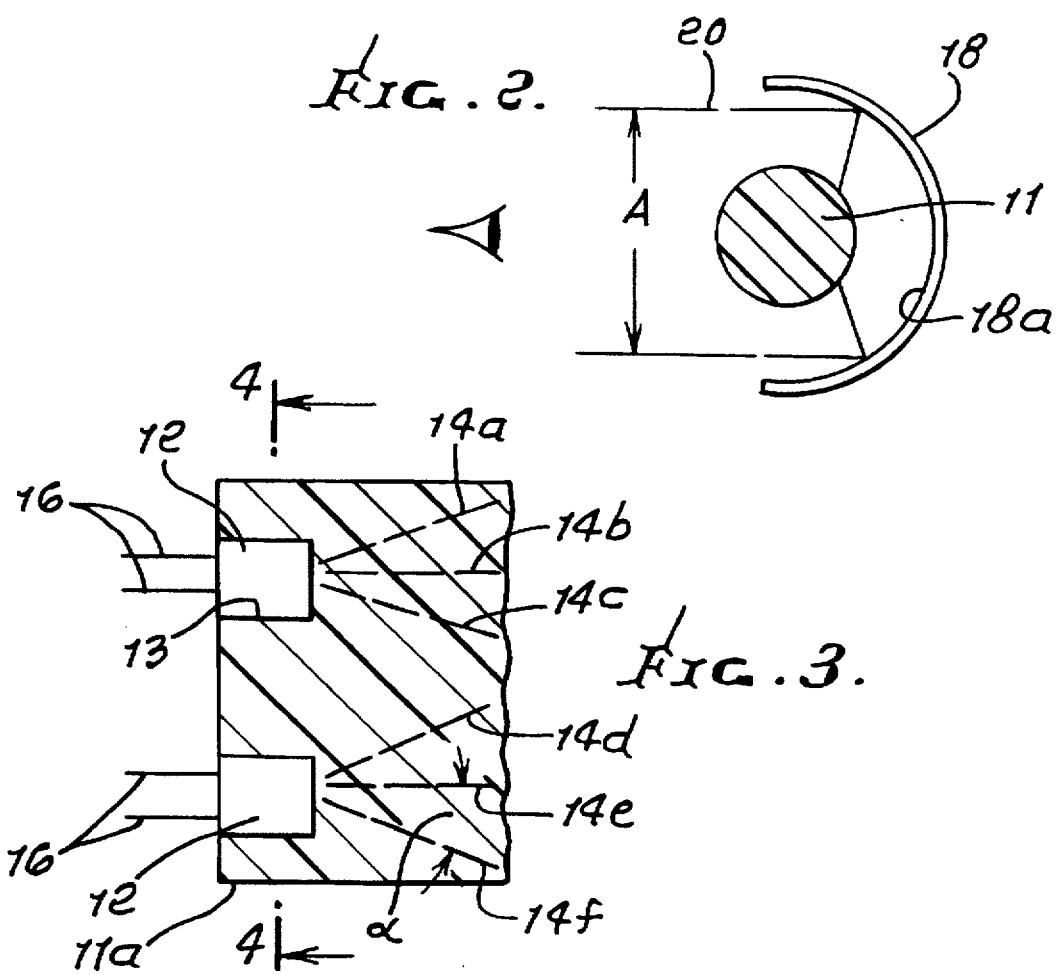
FIG. 2.
FIG. 3.

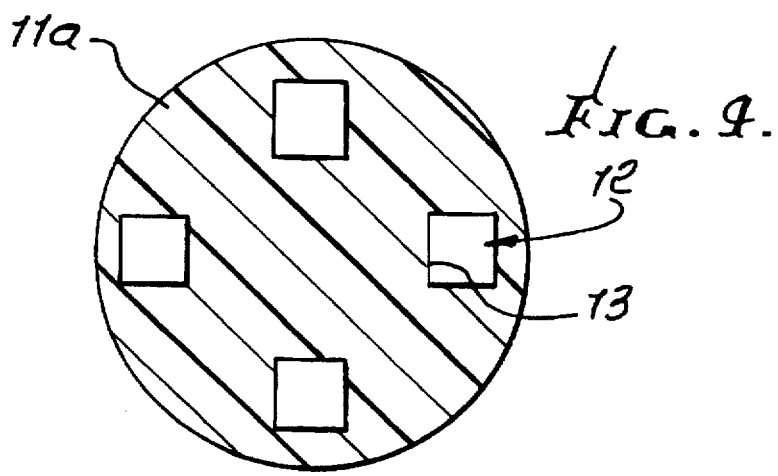
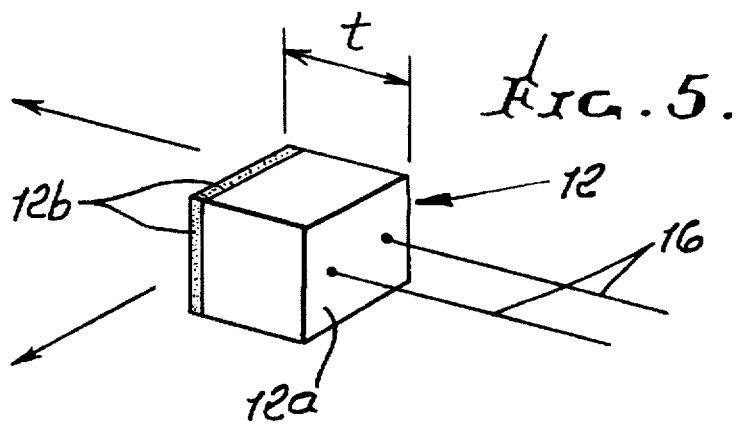
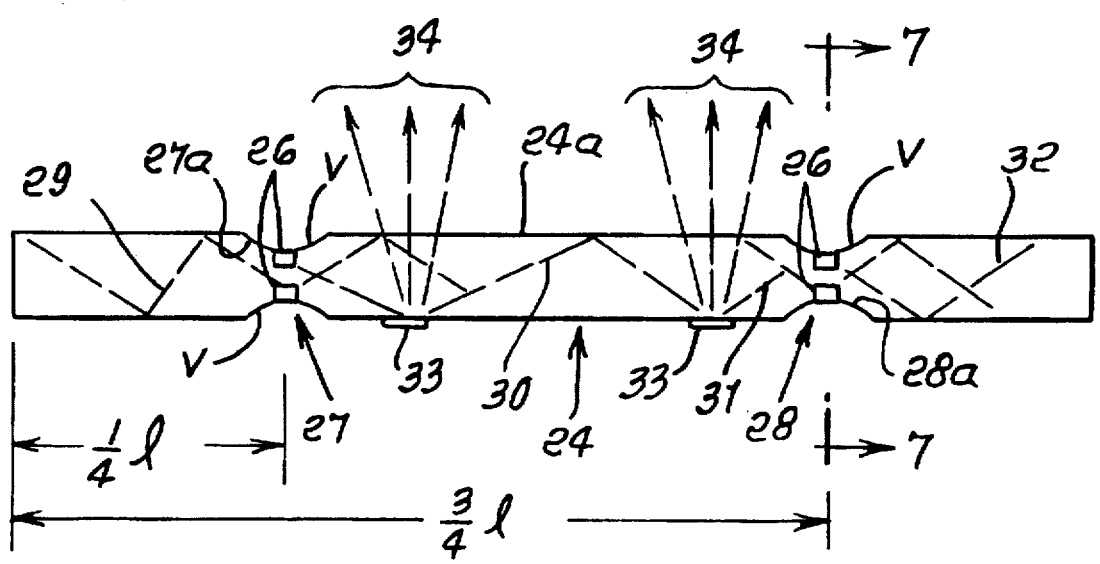

HIGH EFFICIENCY EJECTION OF LIGHT FROM OPTICAL WAVE GUIDE, BY HOLOGRAPHICALLY PRODUCED LIGHT SCATTERING MEANS

BACKGROUND OF THE INVENTION

This invention concerns ejection of radiant electromagnetic energy from optical wave guides, and more particularly by holographically produced light scattering means. Such energy is typically in the form of light.

There is need for apparatus capable of such energy ejection from optical wave guides, as from sites formed to produce controlled energy ejection.

SUMMARY OF THE INVENTION

It is a major object of the invention to provide apparatus meeting the above need. Typically, such energy, in the form of light, is generated via a laser, light emitting diodes (LEDs), or other radiation sources such as incandescent, fluorescent or metal halide lamps. The radiation is injected into an optical wave guide in such a way that the radiation is trapped in the wave guide by Total Internal Reflection. This invention has as an objective the provision of variegated surface relief light scattering sites that eject the radiation from their wave guided TIR modes into a certain preferred solid angle.

As will be seen, the body may consist of light transmitting synthetic material, as in the form of a rod along which and within which the light travels. The scattering sites are typically formed holographically using source and reference beams that impinge upon one another with interference effects. Thus, the scattering sites may be generated holographically by interfering a reference beam with an object beam in a holographic emulsion. The object beam typically comprises a converging input beam of the same angular shape as the desired output beam. The object beam is formed via lenses, mirrors, or computer generated holograms. Once the recording is made in the photographic emulsion it is transferred to nickel master plates, which then are used in impression, injection or ultra-violet curing replication techniques as by formation of a replica on a tape that is then applied to a wave guide.

The resulting variegated surface-relief pattern has a specific geometry and architecture. For example, to create the scattering centers for a cylindrical wave guide (a fiber optic wave guide), one would record the original interference pattern by using a laser beam injected into the end of the cylindrical wave guide and by introducing an object beam into the wave guide through its cylindrical side, the two beams interfering at an emulsion layer adjacent a side of the wave guide. Correspondingly, for a planar wave guide such as a thin plastic sheet, the reference laser beam is injected through the edge of the wave guide, while the object beam is incident through the large surface of the top of the wave guide.

Playback is produced when the laser beam reference is replaced by another light source with a similar wavelength. When LEDs are placed at the end of the cylinder or rod, they become the reference beam. Now the entire system plays back in the opposite direction, i.e. light is emitted from the generated site or sites into the same solid angle as in the object, but as a diverging wavefront.

A further object concerns provision of a source of such energy having an end portion received into said body to transmit energy (such as light) in different directions therein for effecting energy travel lengthwise of the body. The body typically defines a recess and the energy source (such as an LED) end portions received into the recess, formed at an edge portion of the body. Multiple such recesses may be employed, and may be spaced apart, as will be seen. LEDs may be embedded in the body or rod, as will appear.

These and other objects and advantages of the invention, as well as the details of an illustrative embodiment, will be more fully understood from the following specification and drawings, in which:

DRAWING DESCRIPTION

FIG. 1 is an elevation showing "playback" of radiant energy impingement on a site, to re-produce the desired optical readout;

FIG. 2 is an elevation taken in section on lines 2—2 of FIG. 1;

FIG. 3 is an enlarged section taken in elevation through one end of a light transmitting rod, showing LED embedding;

FIG. 4 is an elevation taken in section on lines 4—4 of FIG. 3;

FIG. 5 is an enlarged perspective view showing an LED of the type used in FIGS. 1-4;

FIG. 6 is a view like FIG. 1, but showing light sources embedded in reduced cross sectional zones along a light transmitting rod;

DETAILED DESCRIPTION

Figure 8:
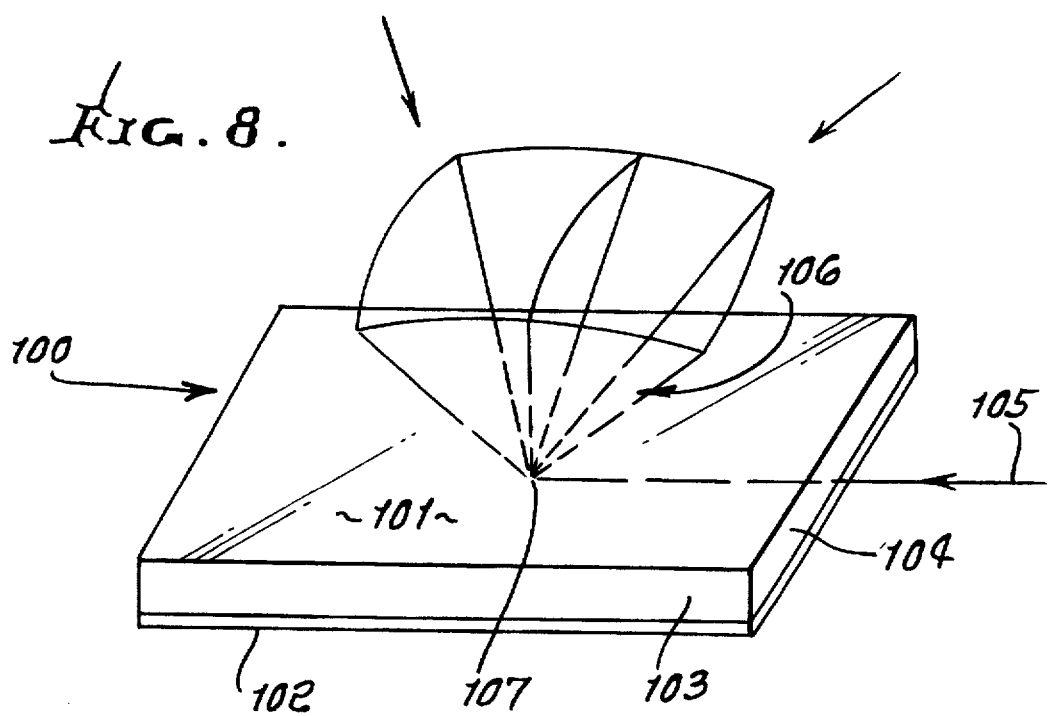
FIG. 8 is a perspective view showing site generation for a planar optical wave guide.

Referring first to FIG. 8, an optical wave guide is in the form of a plate 100 having upper and lower sides 101 and 102, and edges 103 and 104. A thin photographic emulsion 113 covers the plate lower side 102, and may have film shape. The wave guide may consist of synthetic resinous material, and is transparent. A reference light beam 105 is injected edgewise into the plate to travel leftwardly in the plate with Total Internal Reflection off the plate sides 101 and 102.

An object light beam provides an input convergent wavefront 106 entering the top side 101 of the plate and impinges on the reference beam at a site location 107 at the lower side 102 of the plate. The object beam may be formed via lenses or a computer generated hologram, as is known. The two beams interfere at the site location 107 as on emulsion, producing a variegated surface pattern in the developed emulsion corresponding to the object. The pattern in the emulsion is then transferred to a nickel wafer plate. That plate can then be used, as via impression, injection or ultra-violet curing reflection techniques, to re-produce the pattern on a carrier such as a tape seen at 110 in FIG. 1. The tape is applied to the wave guide such as rod 11.

The pattern on the tape constitutes a scattering center or site useful for re-producing the original object beam ejected from the wave guide.

Figure 9:
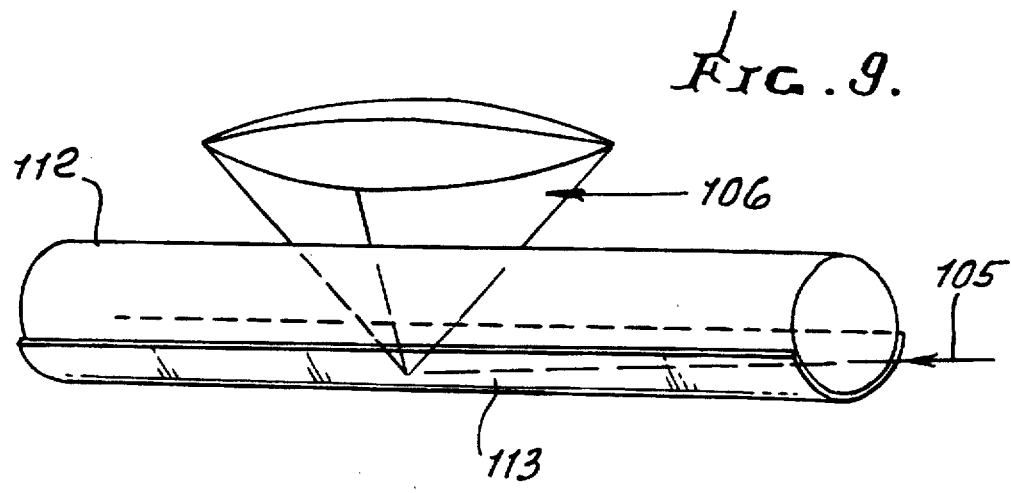
FIG. 9 is a perspective view showing site generation for a rod shaped optical wave guide.

FIG. 9 shows the same principles of site generation, as applied to a wave guide in the form of a rod 112. The photographic emulsion film appears as layer 113.

Regarding typical wave guides, refer to FIGS. 1–4, radiant energy transmitting apparatus being indicated generally at 10, such energy for example consisting of light, as in the visible wave length zone of the spectrum. The apparatus includes an elongated wave guide such as a rod 11 consisting of electromagnetic energy transmitting material, and a source or sources of such energy, each having an end portion recessed into the rod to transmit energy in a preferred direction, for effecting energy travel lengthwise of (i.e. along) the rod. See for example the LEDs 12 received in recesses 13 in the end portion 11a of the rod, so that the LEDs are effectively embedded in the rod end portion. Light from the LEDs is shown being transmitted in different directions 14a–14f, over a range of angles, these showings being illustrative only. A large portion of such light is typically (i.e. within cone of angle α) transmitted as rays extending at angles such as to enable successive total internal reflections off the boundary or periphery of the rod, along its length, for travel lengthwise along and internally of the rod. As shown, the LEDs may be completely embedded, along their lengths in the rod end portion, and may have tight wall-to-wall fits in the recesses 13. LED terminals appear at 16, and a low voltage source 17 is schematically shown or connected with such terminals, in FIG. 1. The rod typically consists of synthetic polymeric material, and may be flexible so as to be bendable. The rod may be considered as a "wave guide", i.e. to guide the light waves for transmission lengthwise of the rod. Usable synthetic polymer include polymers of silicone, urethane, epoxy, polyamide, acrylic, polyesters and others. Glasses are usable. These are transparent.

FIGS. 1 and 2 also show a reflector 18 located at one side of the rod. Light emanating from the rod is reflected, as for example as shown by rays reflected from the interior curved surface 18a of the reflector. The reflector may take the form of discreet light scattering dots, with varying spacing to provide uniformity of collimated light reflection as viewed from the aperture A.

FIG. 5 shows one form of LED 12 having a cube shape, with terminals 16 projecting from the end wall 12a. Light generated by the LED emanates from different walls such as all five remaining walls 12b. Recesses 13 in the rod may have cube shape for embedding such LEDs, with tight fits. A typical cube dimension t is 0.01 inch.

Figure 7:
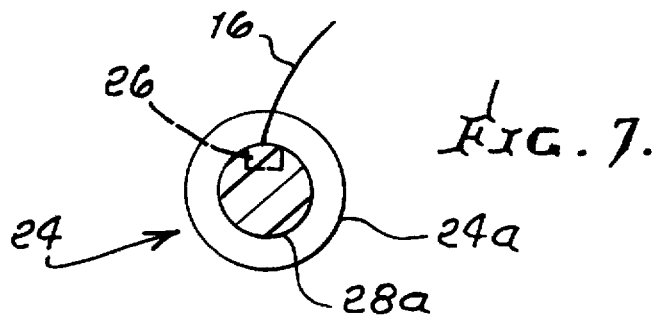
FIG. 7 is an enlarged section taken on lines 7—7 of FIG. 6.

In FIGS. 6 and 7, LEDs 26 are received in recesses along the rod, inwardly of rod outer surface 24a. See recess locations 27 and 28, and rod "venturi" surfaces 26, with tapering at 27a and 28a. See LED produced rays 29–32. Maximum light transmission is effected if locations 27 and 28 are at ¼ l and ¾ l, where l is rod length.

Site locations to eject light "object" rays 34, as described, appear at 33.

Figure 10:
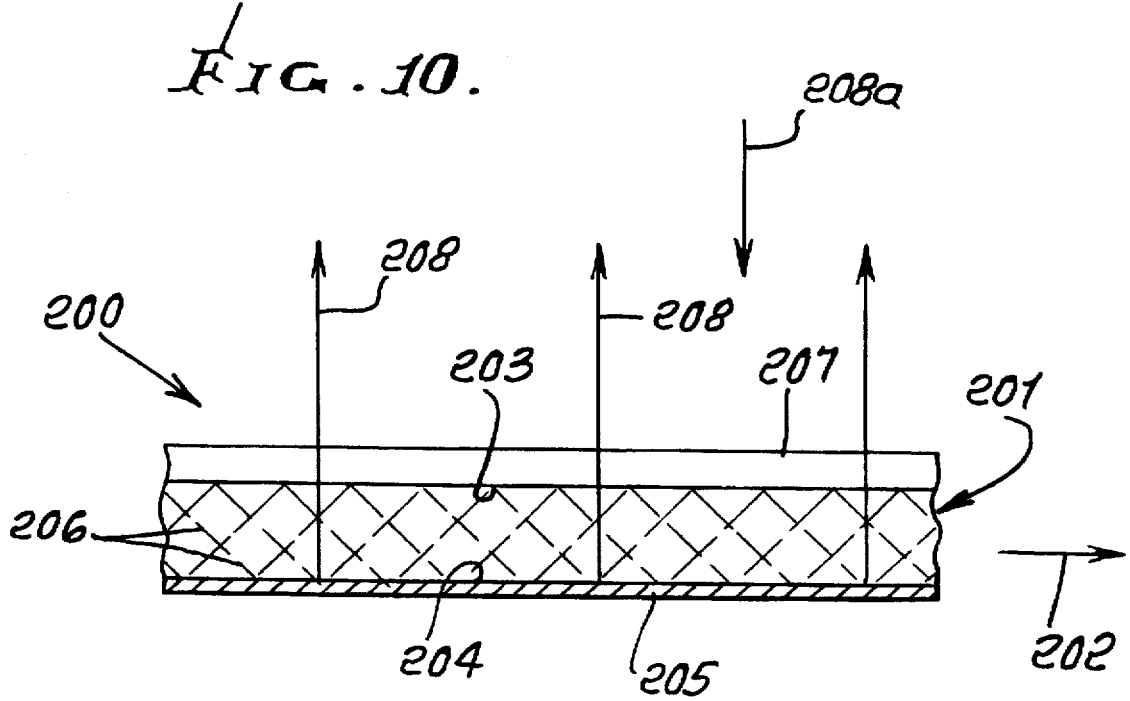
FIG. 10 is an elevation showing a radiant energy transmitting device incorporating a diffuser.
Figure 11:
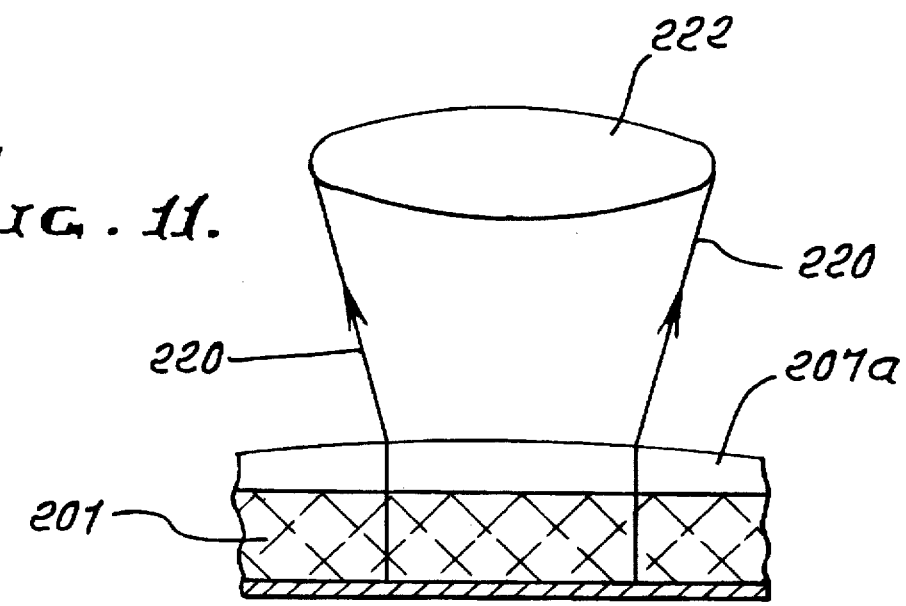
FIG. 11 shows a modification of the FIG. 10 device.

FIG. 10 shows a modification 200 wherein a light-transmitting body 201 is elongated in the direction 202 and consists of light transmitting synthetic material formed to transmit light by total internal reflection off walls 203 and 204 of the body. Such light may be considered as a reference TIR beam 206 or beams. A photographic emulsion 205 layer extends adjacent wall 204 and functions as previously described as at 115 in FIG. 8.

A holographic diffuser layer or plate 207, or film, extends adjacent body wall 203 and acts to transmit light emanating from the emulsion 205 in collimated rays, as indicated at 208. This occurs because of the interaction of the reference beam with the sites defined by the emulsion. Those sites were generated when collimated light, as indicated by rays 208a passed into the body via the diffuser and interacted with the reference beam at the emulsion, creating the sites. The diffuser 207 may be of the type sold by Kaiser Optical, or by Physical Optics Corp., Calif.

FIG. 9 shows a modification like FIG. 10 excepting that the diffuser 207a, in combination with the body 201 and the emulsion, operates to pass emanating light divergently, as indicated by rays 220 and 221, as for example to define an object 222. The sites were generated by rays from a similar object passing back through the diffuser into the body to the emulsion to interact with the reference TIR beam or beams.

I claim:

1. Radiant electromagnetic energy transmitting apparatus, comprising in combination a) an elongated body consisting of electromagnetic energy transmitting material, a source of said energy coupled to said body to inject said energy into the body to travel therein in multiple modes and to be trapped during said travel by total internal reflection off walls defined by the body, b) and there being at least one site within the body having variegated surface relief acting to scatter incident radiant energy for ejection from the body as rays defining a selected solid angle, c) said site characterized as formed holographically.

2. The combination of claim 1 wherein said body consists of light-transmitting synthetic material.

3. The combination of claim 1 wherein there are multiple of said sites in the body.

4. The combination of claim 1 including a light diffuser extending adjacent said body for passing light emanating from the body.

5. The combination of claim 4 wherein the diffuser is a holographic diffuser for transmitting collimated light.

6. The combination of claim 4 wherein the diffuser is a holographic diffuser for transmitting light divergently, away from said body.

7. Radiant electromagnetic energy transmitting apparatus, comprising in combination an elongated body consisting of electromagnetic energy transmitting material, said energy injected into the body to travel therein and to be trapped during said travel by total internal reflecting off walls defined by the body, b) and there being at least one site within the body having variegated surface relief acting to scatter incident radiant energy for ejection from the body as rays defining a selected solid angle, c) and including a source of said energy having an end portion received into said body to transmit said energy in different directions therein for effecting energy travel lengthwise of the body.

8. The combination of claim 7 wherein said body is in the form of a rod that defines multiple recesses, and said energy source includes multiple sources received into said recesses.

9. The combination of claim 8 wherein said recesses are spaced apart along the rod.

10. The combination of claim 9 wherein the rod has opposite side wall extents which are relatively convergent at said recess locations.

11. The combination of claim 10 wherein the rod is narrowed at and proximate said locations.

12. The combination of claim 9 wherein said rod has length "l" and said recesses are located at or proximate to ¼ "l" and ¾ "l", along the rod length.

13. The combination of claim 12 wherein the rod has opposite side wall extents which are relatively convergent at said recess locations.

14. The combination of claim 7 wherein said body defines a recess, and said energy source end portion is received into said recess.

15. The combination of claim 14 wherein said body has an edge portion forming said recess therein.

16. The combination of claim 14 wherein said body is a rod and said recess is formed sidewardly into the rod at a location along the rod length.

17. The combination of claim 7 wherein said site is characterized as formed holographically.

18. The combination of claim 17 wherein said site is initially formed on a photographic emulsion.

19. The combination of claim 7 wherein said body consists of light transmitting material.

20. The combination of claim 19 wherein said material consists of synthetic resin.

21. The combination of claim 7 wherein said source is a light source said end portion of which is smaller than the overall cross-dimension of the rod proximate said source end portions.

22. The combination of claim 7 wherein said energy source is an LED embedded into the rod.

23. The combination of claim 7 wherein said energy source comprise multiple LEDs embedded into the rod.

24. The method of generating an object beam forming site on an optical wave guide that includes a) providing a source of electromagnetic wave energy and coupling said source to said wave guide to pass a reference beam into that wave guide to travel lengthwise therein in different directions and with total internal reflection off walls of the wave guide, b) passing an object beam into the wave guide to interfere with the reference beam, and c) recording a variegated surface pattern corresponding to said interference of said beam.

* * * * *